United States Patent [19]

Herbst

[11] 4,068,891
[45] Jan. 17, 1978

[54] SIDE DUMP TRAILER WITH RETRACTABLE CHUTE

[76] Inventor: Benjamin T. Herbst, P.O. Box 67, Esparto, Calif. 95627

[21] Appl. No.: 733,622

[22] Filed: Oct. 18, 1976

[51] Int. Cl.² ............................................. B62B 1/00
[52] U.S. Cl. ...................................... 298/7; 298/22 P
[58] Field of Search ............................. 298/7, 11–16, 298/22 R, 22 P, 17 R, 18, 17.6; 214/502, 512, 307, 318, 315; 193/4–6

[56] References Cited

U.S. PATENT DOCUMENTS

| 1,372,912 | 3/1921 | Sibrava | 298/11 |
| 2,432,472 | 12/1947 | Hastings, Jr. | 298/11 |
| 3,083,058 | 3/1963 | Walstrom et al. | 298/11 |
| 3,612,364 | 10/1971 | Coucher | 214/622 X |
| 3,844,615 | 10/1974 | Anderson | 214/307 X |
| 3,937,502 | 2/1976 | Gay | 298/11 |
| 3,998,491 | 12/1976 | Diem | 298/11 |
| 4,019,780 | 4/1977 | Bishop | 298/13 X |

Primary Examiner—Frank E. Werner
Attorney, Agent, or Firm—Townsend & Townsend

[57] ABSTRACT

A dump trailer or cart is disclosed suitable for use in a low clearance environment such as an orchard. The cart includes ground support members and a bin useful in a first clearance position to receive material and in a second, elevated position to dump material. Means are provided to lift the bin and means are included to tilt the bin to the second position for dumping the bin into a relatively high-sided container positioned adjacent the cart and laterally spaced therefrom in a manner avoiding instability of the cart. The bin includes a chute that is extensible from the bin side for guiding material into the container at a position past the ground support members and that is retracted during all other times.

9 Claims, 9 Drawing Figures

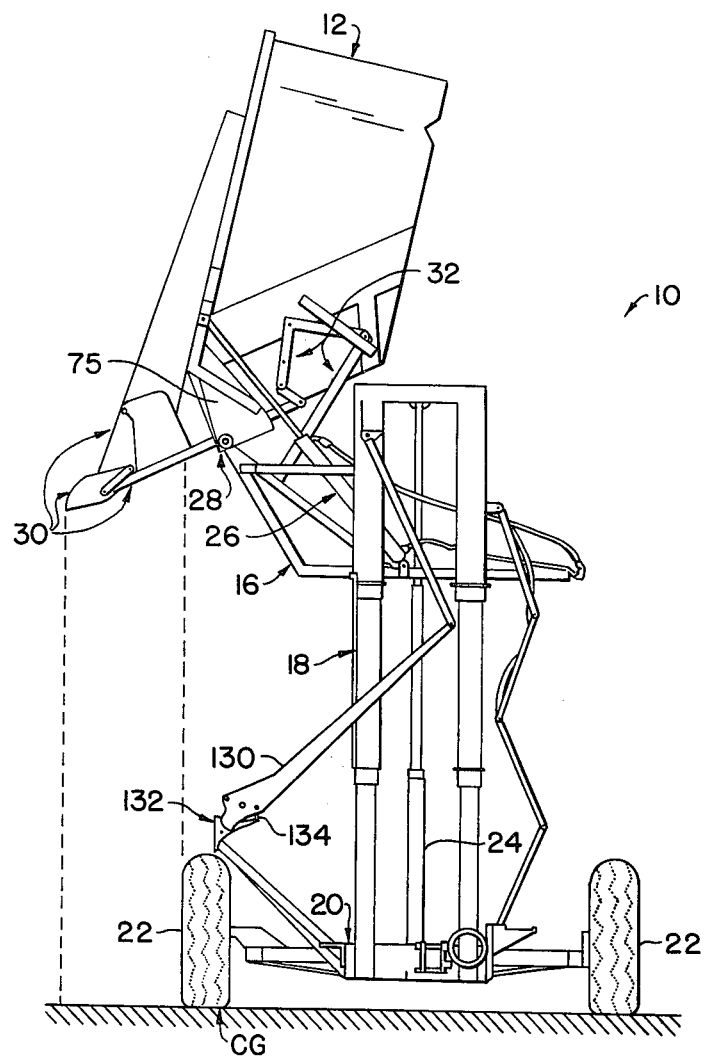
FIG._1.
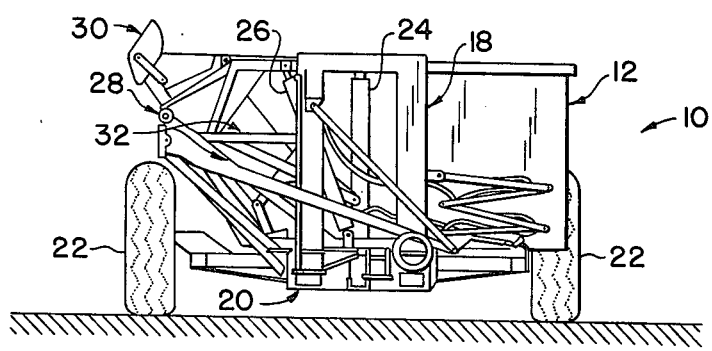
FIG._2.

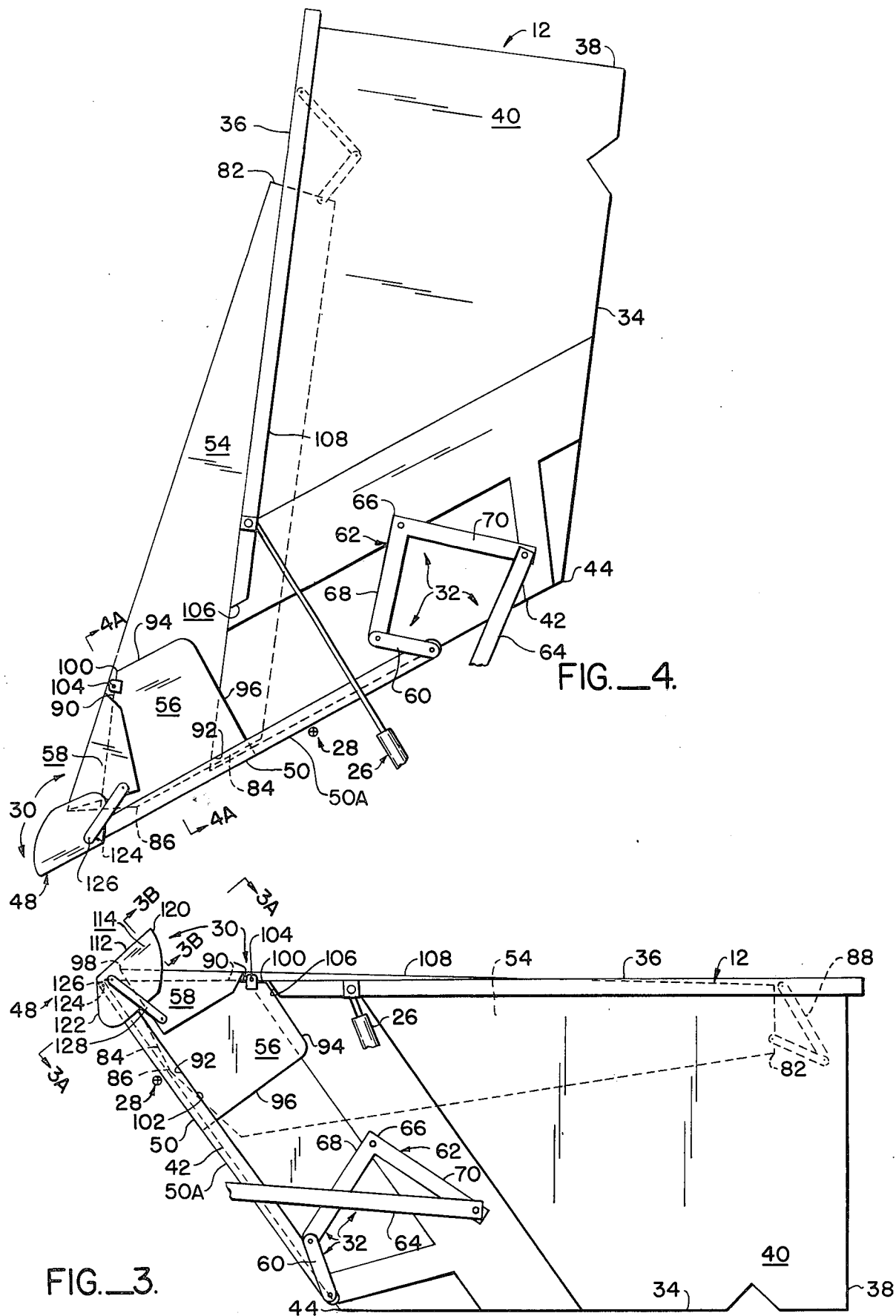

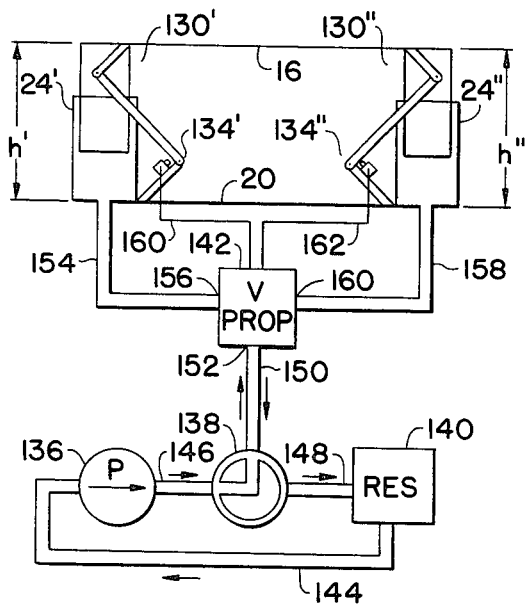
FIG.—5.
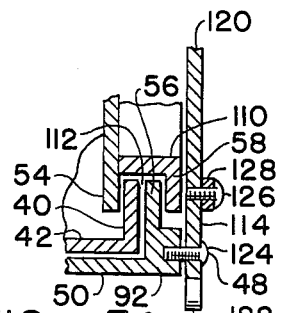
FIG.—3A.
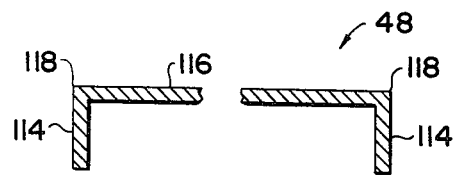
FIG.—3B.
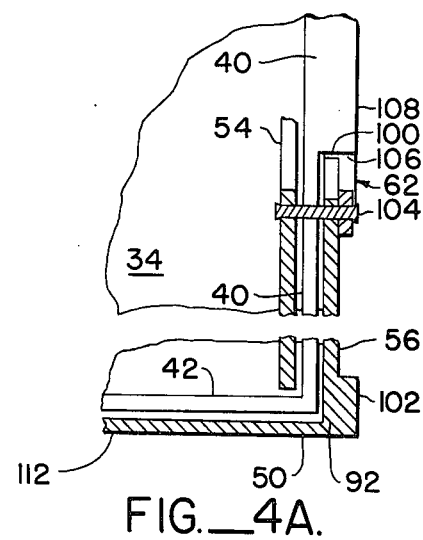
FIG.—4A.

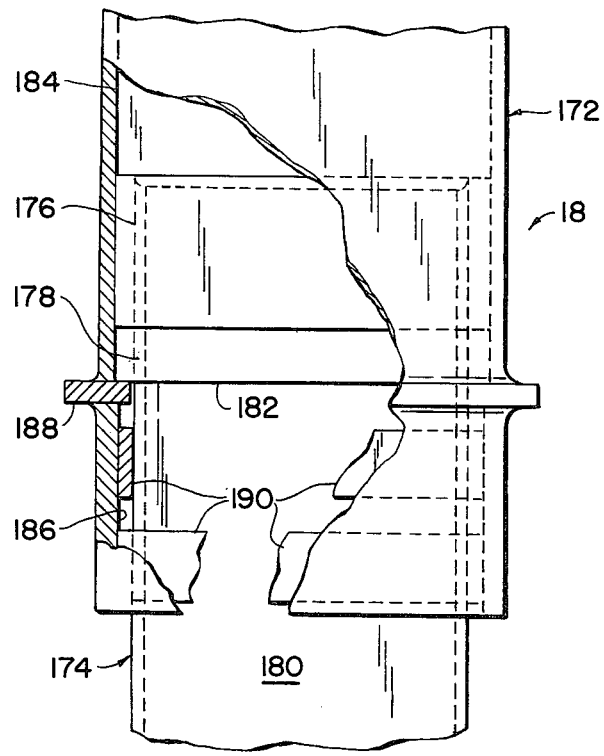
FIG._7.
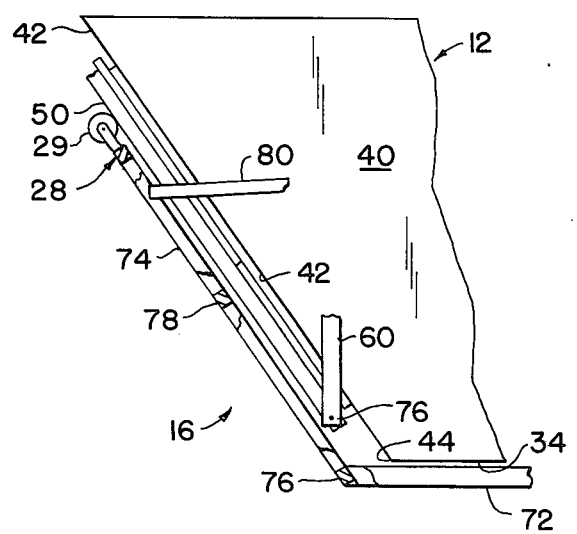
FIG._6.

SIDE DUMP TRAILER WITH RETRACTABLE CHUTE

BACKGROUND OF THE INVENTION

The present invention relates to a self-propelled or drawn dump trailers or carts which have a support frame carried by two or more wheels and, mounted to the frame, a bin that is pivotable about a horizontal, normally longitudinally extending axis so that both materials can be discharged from the bin to the side of the truck or cart. For many applications, it is further necessary for the bin to be raised a substantial distance above ground so that the bin may clear the side walls of a receiving container.

Dump carts of this type are normally especially adapted for the intended use. The cart of the present invention is especially adapted for use in orchards where only a low overhead clearance is available, that is, where the uppermost part of the cart must clear the lower branches of the orchard trees.

Generally speaking, dump carts suitable for use in orchards are used in conjunction with mechanical or pneumatic implements for cleaning the orchard floor of debris such as leaves, twigs, nut shells and the like. The cart is typically drawn behind the implement and filled until full. When full, the material is dumped, either at collection points on the orchard floor, or as is frequently the case, into waiting trailers or trucks. To dump materials into the trucks the bin must be raised relatively high above ground, much higher than its normal filling position when the cart is drawn through the orchard. Since the truck is also laterally spaced from the dump cart, means must also be provided to span the horizontal distance between the cart and the truck.

Prior art side dump carts for use in low overhead clearance environments, such as in orchards sought to achieve the required features in a variety or ways, combining the necessarily low height of the cart with the required horizontal dumping span represented the most difficult problems. Attempts have been made to pivot the bin about an axis which is sufficiently far outward of the support frame of the cart so that the bin edge over which the material is dumped can be placed over the material-receiving container, e.g., the side wall of the truck. This meant that a good portion of the bin was located outside the wheel-base of the cart, rendering the cart unstable, especially in the elevated position. To avoid a potentially dangerous tipover of the cart during the dumping operation, elaborate, complicated and expensive moveable counterweights have been incorporated in such carts. This rendered the carts more expensive and required additional maintenance. Moreover, failure of the counterweight moving mechanisms was possible and could render the cart unstable with a resulting danger to persons and property in the vicinity of the cart.

Other attempts to span the horizontal distance between the dump cart and the truck include an elongation of the dumping side of the bin so that the horizontal distance could be spanned when the bin was pivoted into its dumping position. In its normal, material receiving and storage position, however, such a dump cart had an increased height which limited its usefulness in low overhead environments and rendered it unusable in many low clearance orchards.

As a consequence of these shortcomings of the prior art, many potential users of dump carts, and particularly many orchard operators had to accept the realtively expensive and fail-prone counterweight dump carts described above or they had to use simple collecting carts which were drawn behind the debris collecting implements and from which the collected materials had to be loaded onto a waiting truck manually or with the help of independent conveyors or lifting devices.

SUMMARY OF THE INVENTION

A dump trailer or cart suitable for use in a low clearance environment such as an orchard is disclosed which is capable of discharging loads into a laterally spaced elevated container. The cart includes ground support means and a bin or bed operative in a first low clearance position to receive material and in a second elevated position to dump material. Means are provided for guiding and lifting the bin and for tilting the bin to the side for dumping into a relatively high-sided container in a manner avoiding instability of the cart. The bin includes a chute and sideboards extensible from the bin for guiding dumped material into the container at a position past the ground support members. In the low clearance position, the chute is retracted.

In the preferred embodiment, two pairs of hydraulic actuators are provided. One pair is operative to lift the bin and its support frame substantially vertically along a telescopic guide to a maximum rest position. A hydraulic control mechanism is provided which assures uniform vertical movement of each of the hydraulic actuators.

The second pair of actuators is operative to tip the bin from its support frame. Mechanical linkages are provided for extending the chute and the side boards laterally from the cart. At the maximum tilt position the center of the load remains within the base width of the support members. This renders the cart stable without the need for moving counterweights and the like required in the past. The extended chute assures that the bin may be emptied into a laterally spaced container without spillage. At all other times and particularly while the cart is drawn through the orchard, the chute is retracted and does not add to the lateral or overhead clearance required by the cart.

As a further feature of the invention, the bin chute is slidable along the outer wall of the bin along a track defined by the outer wall and a generally longitudinally extending shaft assembly along the normally horizontal, longitudinally extending bin pivot axis. The shaft assembly serves both as an axle for the bin and a roller bearing for the chute.

As an added feature a pivotable lip is provided at the end of the chute which folds open in response to linkage movement thereby further extending the maximum lateral reach of the dumping bin.

BRIEF DESCRIPTION OF THE DRAWINGS

The invention will be more fully understood by reference to the following detailed description of the preferred embodiment together with the accompanying drawings in which:

FIG. 1 is a front-elevational view of the cart in the elevated and tilted position;

FIG. 2 is a front-elevational view of the cart in the collapsed position;

FIG. 3 is an end view of the bin illustrating a chute and sideboards in the fully retracted or collapsed position;

FIG. 3A is a cross-sectional view along section line A—A of FIG. 3;

FIG. 3B is a cross-sectional view along section line B—B of FIG. 3;

FIG. 4 is an end view of the bin illustrating the chute and sideboards in the tilted fully extended position;

FIG. 4A is a cross-sectional view along section line A—A of FIG. 4;

FIG. 5 illustrates a hydraulic circuit according to the invention;

FIG. 6 is an edge view of a portion of the bin and support frame for illustrating the suspension of the chute; and FIG. 7 is a side-elevational view and partial cutaway of a telescopic guide supporting the bin.

DETAILED DESCRIPTION OF THE PREFERRED EMBODIMENT

FIG. 1 illustrates a dump cart 10 according to the invention in a fully extended or elevated position, and FIG. 2 illustrates the cart 10 in a fully collapsed or low clearance position. The cart 10 comprises an open, broad-mouthed bin 12 supported on a base 20. The bin 12 is pivotally mounted for horizontal or side dumping to a support frame cradle 16, which in turn is hung from A-frame towers 18 at the front and rear of the base 20. The base 20 rides on laterally spaced wheels 22.

Means are provided for raising and lowering the cradle 16 relative to the base 20 and for longitudinally tilting the bin 12 relative to the cradle 16. In particular, vertically disposed hydraulic actuators 24 are mounted on the front and rear of the base 20 adjacent to the towers 18. The hydraulic actuators 24 are operative to vertically displace the cradle 16 relative to the base. Second hydraulic actuators 26 are pivotally mounted to the front and rear of the cradle 16 and the sides of bin 12. Second hydraulic actuators 26 are operative to tilt the bin 12 about a longitudinal shaft 28.

A principle feature of the present invention is a bin chute assembly 30 which can be extended, as shown in FIG. 1, and retracted, as shown in FIG. 2, in response to the longitudinal tilting of the bin 12 about a generally horizontal pivot shaft 28 mounted between the front and rear of the cradle 16 along one side thereof. A pair of linkages 32 at the front and rear of the cradle 16 coupling the cradle 16, bin 12 and the chute assembly 30 control the tilting of the cart 10 about shaft 28, as hereinafter explained.

To more fully illustrate the bin 12 and the associated chute assembly 30, references are made to FIG. 3 and FIG. 4. In FIG. 3, a side of the bin 12 is shown as viewed from the front side of the cart 10. The bin 12 comprises generally a four-sided box having a bottom 34, wide mouthed top 36, a generally rectangular back side panel 38 adjacent one longitudinal side of the cart 10, trapezoidally shaped forward and rear panels 40 adjacent the front and rear of the cart 10 (rear panel 60 being a mirror image of the front panel), and an outwardly slanted front side panel 42 adjacent the other longitudinal side of the cart 10. In other words, the front side panel 42 joins the bottom 34 at an obtuse angle, which is along a longitudinal seam 44.

The retractable and extensible chute assembly 30 is mounted to the bin 12 in a generally U-shaped configuration around the open top 36 so as to serve as an extension for the front and rear panels 40 and for the forward side panel 42. The chute assembly 30 comprises a lip 48 linked to a base plate 50, slidably disposed along the forward side panel 42, and two sets of sideboards 54, 56 and 58 disposed along front and rear panels 40.

The linkage 32 consists of three links, a first short straight link 60, a second L-shaped link 62, and a third long straight link 64. The L-shaped link is shown to be hinged at an elbow 66 to forward panel 42 with arm segments 68 and 70 directed respectively toward the margin of the forward side panel 42 and the margin of the bottom 34. Short link 60 joins the end of arm 68 and the end of base plate 50. Long link 64 joins the end of arm 70 and the cradle (not shown).

The chute assembly 30 extends and retracts in response to means moving the linkage 32 relative to the bin 12, as hereinafter explained in greater detail.

Referring now to FIG. 6, the support and transport mechanism of base plate 50 is illustrated. The bin 12 is shown in the lowered or rest position with the bin bottom 34 resting on a cross member 72 of cradle 16. The cradle 16 is further seen to comprise a side brace 74 (which is disposed generally parallel to the bin forward side 42 when the bin 12 is in the lowered position), first longitudinal strut 76 (which is shown in cross section generally parallel to bin seam 44 between side brace 74 at the front of cradle 16 and a similar side brace at the rear of cradle 16), and second longitudinal strut 78 (shown in cross section), and miscellaneous cross members such as cross member 80 laterally bracing cradle 16.

Pivot shaft 28 (shown in cross section) is mounted through the top end of side brace 74 at the front and rear of cradle 16 and extends through side plates 75 (FIG. 1) rigidly mounted to bin 12. Roller bearings 29 (FIG. 6) are mounted to pivot shaft 28 for moveable support of the base plate 50, which is disposed along bin forward side 42. In other words, a channel for sliding the base plate 50 is established between the cradle 16 and the forward side panel 42 of bin 12, such that plate 50 is guided by roller bearings 29. The travel of base plate 50 along the forward side panel 42 is controlled and delimited by arm 60, at the same time rotation is permitted about the pivot defined by shaft 28.

Reference is again made to FIGS. 3 and 4 for an explanation of the operation of chute assembly 32. It is first noted that the entire bin 12 is pivotal about shaft 28, the location of which is indicated for the purposes of orientation. First sideboard 54 is a plate for extending the height of bin front panel 40. Sideboard 54 has a relatively narrow back edge 82 and a relatively long forward edge 84 which roughly conforms to the inside face of forward side panel 42. Midway along edge 84 is a slight peak or crown 86 separating edge 84 into an upper and lower portion confronting the forward side panel 42 inside surface. First sideboard 54 is mounted within the open end 36 and connected by an articulated arm 88 linking the back edge 82 to the top margin of panel 40.

Second sideboard 56 is a flat foursided trapezoidal plate resembling a rectangle adjacent a right triangle. Second sideboard 56 has a hypotenuse edge 90, a base edge 92, a top edge 94 and a back edge 96. Base edge 92 joins hypotenuse 90 at an acute corner 98, and top edge 94 joins hypotenuse edge 90 at an obtuse corner 100. Hypotenuse edge 90 is shown in partial phantom in FIG. 3 and FIG. 4. Second sideboard 56 is affixed to the inside of a lip 102 of base plate 50 along the outside of front panel 40. This is shown most clearly in FIG. 4A, which is a sectional view along line 4A of FIG. 4.

Referring particularly to FIG. 4 and to FIG. 4A, it is seen that first sideboard 54 is hingedly joined along its top margin to second sideboard 56 adjacent obtuse corner 100. A short pivot shaft 104 links first and second sideboards 54 and 56 across the top margin of front panel 40. A shoulder 106 and the end of reinforcing tube 108 along the top margin of front panel 40 is provided for clearance of the top edge 94 of side panel 56. Guidance is provided by rollers 29 (FIG. 6) and the side 42 of bin 12, since panel 56 is affixed to base plate 50.

Third sideboard 58 is a flat, generally right triangular plate (FIG. 3). Sideboard 58 is disposed outboard of sideboard 56, front panel 40 and sideboard 54 at front edge 84. Along the hypotenuse of sideboard 58 is a bridge 110 between sideboard 54 and sideboard 58 (FIG. 3A). The bridge 110 is attached to the top margin of sideboard 54 to form a U-shaped channel 112 (FIG. 3A) sufficiently broad to accomodate the thickness of sideboard 56 and panel 40.

Referring to FIG. 3B, the bin lip 48 is shown in cross section. Bin lip 48 is seen to be wide, and generally U-shaped, comprising short side members 114 joined by a long plate 116 along relatively straight edges 118. Plate 116 extends the length of the bin 12 such that side members 114 are disposed outboard of the base plate 50 and sideboards 58 at the forward and rear sides of bin 12.

Referring to FIG. 3 or FIG. 4, the side member 114 is seen to include a toe end 120 and an open heel 122. Referring particularly to FIG. 3A with FIG. 3, a first pivot shaft 124 through bin lip side member 114, joins bin lip 48 to base plate 50, and a parallel second pivot shaft 126 joins side member 114 to a drag link 128, hingedly coupling lip 48 to sideboard 58. The shafts 124 and 126 provide mechanical coupling between linkage 32 and sideboards 54, 56 and 58 of chute assembly 30.

Motive force for tipping the bin 12 is provided by hydraulic actuators 26 and 28 hinged to the front and back panels 40, for example along flange 108. Tipping of the bin 12 and extension of the chute assembly 30 takes place as follows. The hydraulic actuator 26 lifts the bin 12 pivoting it about shaft 28, so that the chute assembly 30 is drawn from the retracted position of FIG. 3 to the fully extended position of FIG. 4 by linkages 32. Specifically, as the actuator 26 is extended, long link 64, coupled at one end to cradle 16 (FIG. 1), draws L-shaped link 62 about its axis at elbow 66. Short link 60 follows, drawing base plate 50 upwardly along front side panel 42. Base plate 50, affixed to sideboard 56 and linked to lip 48, pushes lip 48 upwardly; member 128 in turn draws sideboards 58 and 54 up and out of the bin 12. Sideboard 56 slides upwardly and outwardly along the outside of front panel 40, pivoting at shaft 104 while sideboard 54 slides along the inside of panel 40. The bin 12 tips laterally about pivot shaft 28, and eventually downwardly, as the lip 48 flips outwardly into a fully extended position resulting from a change in the relative positions of lip 48 and sideboards 56 and 58. A load within the bin may thereby be discharged into a receptable spaced laterally from the side of cart 10 (FIG. 1). In this extended position, the cart's center of gravity is approximately just inboard of pivot shaft 28 although the toe end 120 of lip 48 is spaced a substantial distance from the outboard side of wheel 22.

Once a load has been discharged, the bin 12 is leveled, and the chute assembly 30 is retracted merely by collapsing the hydraulic actuators 26. This causes the linkage assembly 32 to draw base plate 50 back along bin forward side 42, retracting the sideboards 54, 56 and 58. As the bin 12 tips, drag links 128 causes lip 48 to pivot due to relative motion of lip 48 and sideboards 54, 56 and 58.

Referring particularly to FIG. 1 and FIG. 2, it is seen that vertical hydraulic actuators are operative to control the height of towers 18, and thereby the height of bin 12. The vertical movement of cradle 16 is mechanically guided along a substantially vertical path defined by the telescopic masts 18, two of which are disposed on either side of the hyraulic cylinders 24 in the forward portion of base 20 and two similarly arranged at the rear of base 20. A pair of articulated arms 130 at the front and rear of the cart 10 are provided to sense the differential height between front and rear towers 18. The lower end of each arm 130 is attached to base 120, at pivot elbow 132 and the upper end is hinged to tower 18. The elbow 132 on the lower segment of the arm 130 includes a sensor switch 134 interconnected to the hydraulic system controlling the raising and lowering of the towers 18.

Referring now to FIG. 5, there is shown a portion of a possible control hydraulic circuit for regulating the relative travel rate of the front and rear hydraulic actuators 24. The circuit comprises a pump 136, a two-way divider valve 138, a reservoir 140, a proportional flow divider valve 142, and hydraulic line providing fluid communication thereamong. A hydraulic line 144 couples the reservoir 140 and the pump 136. A hydraulic line 146 couples pump 136 and two-way valve 138, and a hydraulic line 148 couples two-way valve 138 and reservoir 140. A hydraulic line 150 couples two-way valve 138 to a main supply port 152 of proportional valve 142. A hydraulic line 154 couples a first regulated outlet 156 and a proportional valve 142 to one of the hydraulic cylinders 24', and a hydraulic line 158 couples a second regulated outlet 160 to the other of the hydraulic cylinders 24''. A first control line 160 is provided between sensor switch 134 (shown schematically on a schematic representation of a first articulated arm 130') and the proportional valve 142. Similarly a second control line 162 is provided between the second sensor switch 134'' on articulated arm 130'' and proportional valve 142.

The control circuit operates as follows. The pump 136 directs fluid flow through the two-way valve 138 into the proportional valve 142, which divides flowing hydraulic fluid into two paths, directing the fluid through lines 154 and 158 to the respective hydraulic cylinders 24' and 24''. The switches 134' and 134'' sense the differential height of the hydraulic cylinders 24' and 24'' respectively. For example, if hydraulic actuator 24' achieves a height H' which is substantially greater than the height H'' of hydraulic actuator 24'', switch 134'' is actuated to cause the proportional valve 142 to adjust the relative rate of flow between the outlets 156 and 160 so that the height H'' of actuator 24'' increases at a slightly greater rate than height H'. In this manner the hydraulic cylinders 24' and 24'' extend at substantially identical rates.

With the valve 138 directing flow between hydraulic lines 150 and 148 into the reservoir 140, the force of gravity on the cradle 16 causes the chambers of hydraulic cylinders 24' and 24'' to contract. The proportional valve 142 is responsive to signals from switches 134' and 134" to regulate the return flow rate assuring substantially identical rates of contraction.

The components of the hydraulic circuit are conventional and generally commercially available. In particular, the proportional divider valve 142 and associated sensing switches 134 are obtainable from Stockman Manufacturing Co. of Greybull, Wyoming.

Referring now to FIG. 7, a detail of one of the telescopic towers 18 is shown. Each tower comprises an external tube 172 and an internal tube 174 slidably disposed within the external tube 172. The internal tube 174 includes a bushing 176, a sleeve 178 and a central shaft 180. The bushing 176 is bronze-coated steel disposed to slidably engage the inner walls of external tube 172. The sleeve 178 is of slightly narrower diameter and is disposed below the bushing 176. The junction of the sleeve 178 and the shaft 176 defines a downwardly facing support shoulder 182.

The external tube 172 comprises a top cylindrical portion 184, a bottom cylindrical portion 186, an annular stop block flange 188 and a pair of bronze bushing strips 190. The top cylindrical portion 184 is welded to one side of the stop block flange 188, and the bottom cylindrical portion 186 is welded to the opposing side of the flange 188. The bronze bushings 190 are disposed along the inner surface of bottom cylinder 188. The external tube 172 circumscribes the internal tube 174. External tube bushings 190 are slidable against the outer surface of internal tube 174, which is generally polished, while internal tube bushing 176 rides on the opposed inner surface of top cylinder portion 184.

The inner diameter of flange 188 facing the outer surface of the shaft segment 180 is slightly greater than the diameter of shaft segment 180 but less than the diameter of the adjacent sleeve 178. Shoulder 182 of internal tube 174 therefore encounters only flange 188, to limit relative travel of the external tube 172 and internal tube 174. The outer diameter of sleeve 178 is purposefully less than the inner diameter of external tube 172 so that the surface or bushing 176 serves as the slide bearing. This prevents binding between internal tube 172 and shaft 180, which might otherwise result from impact caused flare at shoulder 182.

A dump cart according to this invention is particularly useful in low overhead clearance environments, such as in orchards. It combines the features of a low height in a material receiving and storing position with the necessary horizontal dumping span for discharging loads. The cart maintains a stable center of gravity even in a fully extended dumping position without elaborate, complicated or expensive moveable counterweights. Moreover, the possibility of danger or failure of the counterweight moving mechanism has been eliminated. Particular features of the present invention have been described which would enable the ordinary mechanic to practice the invention. Many modifications and variations will be obvious in view of the present disclosure. It is therefore intended that the invention be limited only as indicated by the appended claims.

I claim:

1. A stable dump cart capable of operating in a low overhead environment for the discharge of materials from the cart into a container having a relatively high side, the cart comprising: a support frame including a plurality of laterally spaced-apart members supporting the frame on the ground, the support members comprising a plurality of spaced-apart wheels defining between them a lateral wheel base; a bin carried by the frame for receiving materials that are to be dumped into the container; means attached to the frame and the bin for moving the bin in a vertical direction between a lowermost material receiving position attached to the frame and an uppermost position, from which the materials are discharged into the container, the vertical movement means comprising a pair of spaced-apart hydraulic actuator means and including means for flowing hydraulic fluid under pressure to the actuator means; means for adjusting the rate of flow to the actuator means so that the actuator means move at substantially identical rates when the fluid flowing means is actuated; said vertical movement means further including means guiding the bin along a substantially vertical path when the hydraulic actuators are energized, the bin guiding means comprising a pair of spaced-apart, vertically oriented and vertically extensible masts operatively connecting the pivot means with the frame; each mast being defined by a pair of spaced-apart vertical posts and an uppermost, generally U-shaped member having downwardly extending legs engaging and guided by the posts; means attached to the vertical movement means for tilting the bin from the material receiving and holding position into an inclined material dumping position, the tilting means being disposed within the lateral extent of the support members to thereby avoid any instability of the cart during the dumping operations; and means for guiding materials being dumped from the bin laterally past the support members into the container positioned adjacent the cart and laterally spaced from the support members.

2. A cart according to claim 1, wherein the hydraulic actuator has a first end connected to the frame and a second end connected to the extensible masts, and wherein the pivot means is attached to the extensible masts.

3. A stable dump cart capable of operating in a low overhead environment for the discharge of materials from the cart into a container having a relatively high side, the cart comprising: a support frame including a plurality of spaced-apart members supporting the frame on the ground; a bin carried by the frame for receiving materials that are to be dumped into the container; means attached to the frame of the bin for moving the bin in a vertical direction between a lowermost material receiving position and an uppermost position, from which the materials are discharged into the container; means attached to the vertical movement means for tilting the bin from the material receiving and holding position into an inclined material dumping position, the tilting means being disposed within the lateral extent of the support members to thereby avoid any instability of the cart during the dumping operation, the tilting means comprising means for pivoting the bin about a substantially horizontal axis; wherein the bin has at least one side wall extending in the direction of the pivot axis of the bin; and means for guiding materials being dumped from the bin laterally past the support members into the container position adjacent the cart and laterally spaced from the support members, and wherein the material guiding means comprises extender means for extending the effective length of the side wall past the uppermost edge of the bin and retracting the extender means when the bin is pivoted between its material dumping position and its normal, material receiving position, respectively, at least a major portion of the extender means being disposed below the uppermost bin edge when the bin is in its normal position.

4. A cart according to claim 3, wherein the material guide means comprises a first chute plate having a size and shape complementary to that of the bin side wall and being located in a bin side wall overlapping position when the bin is in its normal position.

5. A cart according to claim 4, wherein the chute plate is disposed on an exterior of the bin side wall; and including means for securing the chute plate to the bin side wall and for linearly guiding the chute plate for movement relative to the bin side wall between its retracted and extended positions.

6. A cart according to claim 5, wherein the bin side wall is a planar side wall; and wherein the bin includes a pair of end walls that are contiguous and transverse to the side wall; and wherein the material guide means further includes a pair of spaced apart end plates which are closely adjacent and parallel to the end walls; and means for moving the end plates with the chute plate between a retracted position in which the end plates substantially fully overlap the end walls and an extended position in which the end plates effectively extend the end walls past their uppermost edge; whereby spillage of material being dumped and flowing over the portion of the chute plate extending beyond the uppermost edge of the bin is prevented.

7. A cart according to claim 6, including a generally U-shaped trough member for extending the effective length of the chute plate when the chute plate is in its extended position, means connected to a free end of the chute plate for pivoting the trough member about a substantially horizontal axis that is parallel to the chute plate between a first position in which a center section of the trough member is angularly inclined relative to the chute plate and a second position in which the center section is substantially parallel and aligned with the chute member; whereby the lateral extent over which the material can be dumped is further increased by the center section while the trough member does not significantly protrude above the uppermost edge of the bin when the guide plate is retracted.

8. A cart according to claim 5, including means for moving the chute plate comprising link means attached to the bin for pivotal movement about a generally horizontal axis parallel to the pivot axis of the bin, means connecting a first end of the link means with the chute plate, and means pivotally connecting a second end of the link means to the vertical movement means; whereby pivotal movement of the bin between its normal and its dumping position causes the link means to extend and retract the chute plate.

9. A stable dump cart capable of operating in a low overhead environment for the discharge of materials from the cart into a container having a relatively high side, the cart comprising a support base including a plurality of laterally spaced apart wheels supporting the base on the ground; an open mouthed bin; a cradle for carrying the open mouthed bin; telescopic towers vertically disposed at the front and the rear of the base for supporting said cradle; hydraulic actuating means disposed between said base and said towers for raising and lowering said towers; means for pivoting said bin on said cradle about a longitudinal axis; a second pair of spaced apart hydraulic actuator means disposed at the front and rear of said cradle operative for tilting said bin about said pivoting means; means for flowing hydraulic fluid under pressure to said hydraulic actuators; means for sensing the relative height of the front and rear of said cradle and for adjusting the rate of flow to hydraulic actuators raising said cradle so that said actuators move at substantially identical rates when the fluid flowing means is actuated; material guiding means including extender means for advancing the effective length of an outwardly extending side wall of said bin along said horizontal pivoting means past an uppermost of said bin and for retracting said extender means when the bin is pivoted between its material dumping position and its normal, material receiving position, respectively, at least a major portion of said extender means being diposed below the uppermost bin edge when the bin is in its normal position, said extender means including a first chute plate having a size and shape complimentary to that of said outwardly extending bin side wall and being located on an exterior of said outwardly extending bin side wall and including means for securing said chute plate to said bin side wall and for linearly guiding said chute plate in movement relative to said bin side wall between its retracted and extended positions, said extender means further including a pair of spaced apart sideboard plates which are closely adjacent and parallel to bin front side and rear side walls; means for moving said end plates with said chute plates between a retracted position, in which the end plates substantially fully overlap said bin front side and rear side walls, and an extended position in which said plates effectively extend the end walls past their uppermost edge; a generally U-shaped lip member for extending the effective length of said chute plate when said chute plate is in its extended position; lip member pivoting means connected to a free end of said chute plate including link means attached to said bin for pivotal movement about a generally longitudinal axis parallel to said pivot axis of said bin, means connecting a first end of said link means with said chute plates, and means pivotally connecting a second end of said link means to the vertical movement means for pivoting said lip member about a substantially longitudinal axis, disposed parallel to said chute plate between a first position, in which a center section of said lip member is angularly inclined relative to said chute plate, and a second position, in which the center section is substantially parallel and aligned with said chute member, whereby pivotal movement of said bin between its retracted position causes said link means to extend and retract said chute plate, said U-shaped lip member, and said end plates for preventing spillage of material being dumped and flowing over the portion of the chute plate and U-shaped lip extending beyond the uppermost edge of said bin.

* * * * *